(12) United States Patent
Arnaudov et al.

(10) Patent No.: US 11,360,801 B2
(45) Date of Patent: Jun. 14, 2022

(54) SINGLE NESTED MULTI-ITEM WORKFLOW DISPLAY

(71) Applicant: VMware, Inc., Palo Alto, CA (US)

(72) Inventors: Nikola Arnaudov, Sofia (BG); Valentin Likyov, Sofia (BG); Daniel Vatov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 74 days.

(21) Appl. No.: 16/743,708

(22) Filed: Jan. 15, 2020

(65) Prior Publication Data

US 2021/0216356 A1    Jul. 15, 2021

(51) Int. Cl.
*G06F 9/46* (2006.01)
*G06F 9/455* (2018.01)
*G06F 9/50* (2006.01)

(52) U.S. Cl.
CPC ............ *G06F 9/46* (2013.01); *G06F 9/45558* (2013.01); *G06F 9/45541* (2013.01); *G06F 9/5077* (2013.01); *G06F 2009/4557* (2013.01); *G06F 2009/45562* (2013.01)

(58) Field of Classification Search
CPC ..... G06F 9/46; G06F 9/45558; G06F 9/45541
See application file for complete search history.

(56) References Cited

U.S. PATENT DOCUMENTS

| | | | |
|---|---|---|---|
| 9,754,167 B1* | 9/2017 | Holz | G06K 9/00355 |
| 2013/0332178 A1* | 12/2013 | Zhong | G06Q 10/06 705/1.1 |
| 2019/0146998 A1* | 5/2019 | Jin | G06F 9/46 718/104 |
| 2021/0216356 A1* | 7/2021 | Arnaudov | G06F 9/46 |

\* cited by examiner

*Primary Examiner* — Camquy Truong
(74) *Attorney, Agent, or Firm* — Thomas | Horstemeyer, LLP.

(57) ABSTRACT

Aspects of a workflow evaluation interface for validating, debugging, and evaluating virtual machine workflows are described. In one example, a method for displaying a workflow includes capturing a workflow for management of at least one virtual machine. The workflow can include a number of schema elements, among other attributes, input parameters, and output parameters for tasks of the workflow. The method can also include evaluating a logical flow among the schema elements in the workflow and populating a flow panel in a workflow evaluation interface. The flow panel can include a hierarchical flow of tasks in the workflow and at least one nested multi-task sequence in the workflow. The flow panel can include a carrot to expand the nested multi-task sequence as a branch of the hierarchical flow of tasks. The method can also include rendering a graphical representation of the logical flow among the plurality of schema elements.

20 Claims, 4 Drawing Sheets

SINGLE NESTED MULTI-ITEM WORKFLOW DISPLAY

BACKGROUND

Virtualization involves the logical arrangement and separation of various types of computing hardware, such as processors, network interface devices and resources, storage devices, and other computing resources. Virtualization can be relied upon as a way to logically segment or divide the hardware resources of server computers between different operating systems and applications executing on those operating systems. The software that creates virtual machines on hardware resources is often called a hypervisor or virtual machine monitor. The software that executes on a given virtual machine can be logically separated from that executing on other virtual machines. For example, the hardware resources of server computers can be virtualized to support two different types of operating systems, logically separated from each other, and supported by the same hardware resources.

Virtualization is one part of a trend in information technology to facilitate the cost-effective management and distribution of hardware resource pools. Virtualization can also be used to centralize administrative overhead and improve flexibility and scalability. Using virtualization, information technology administrators can also quickly manage updates and changes to the configurations of virtual machines and the operating systems and applications executing on the virtual machines. Virtual resources can be dynamically adapted to meet changing needs with less administrative overhead and other costs.

The widespread adoption of virtualization in various industries has fostered the foundation of cloud computing. The adoption of virtualization has resulted in the need for new, specialized virtualization management software to manage virtualized resources.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The adoption of virtualization has resulted in the need for new, specialized virtualization management software to manage hardware resources. For example, a hypervisor or virtual machine monitor can be used on a desktop computing device to virtualize the computing hardware of the desktop computing device and instantiate a number of different operating systems, for example, that all execute on the same desktop computing hardware. In the context of a larger data center including a number of networked server computing devices, an enterprise-class hypervisor can be used to collectively virtualize and manage the computing hardware of the servers in the data center. The enterprise-class hypervisor can virtualize and manage a hybrid combination of local and cloud-based hardware resources.

The management solutions for enterprise-class hypervisors permit the central management of application installations, application updates, operating system updates, and other changes to hybrid combinations of hardware resources. Some modern management solutions for enterprise-class hypervisors also support the live migration of virtual machines and the live migration of virtual disks between different hardware platforms, among other operations, with little or no downtime during the migration.

Enterprise-class solutions can also include other features to improve the efficiency, agility, and flexibility in the management of large pools of virtualized resources. For example, enterprise-class management solutions can also include the ability to create workflows. Workflows can be created to automate complicated information technology (IT) processes. An example workflow may define a number of steps or tasks to be processed, such as a number of application installations, application updates, operating system updates, backups, migrations, and other IT-related process tasks for a large pool of virtualized resources. A number of variables or other parameters may be evaluated as part of the workflow, to direct the logical flow of the workflow. Thus, workflows can extend the capabilities of enterprise-class management solutions. As described in further detail below, workflows can be developed using a workflow development editor. The development of a new workflow includes a number of phases, including phases for evaluating, debugging, and verifying the workflow.

In some cases, the logical flow of a workflow may include a number of iterative loops, branches, and nested multi-task logical flows. The logical flow of a large workflow may become quite complicated and difficult to evaluate and debug in many cases. Previous workflow development editors failed to provide developers with a comprehensive view of the logical flow among each iterative loop, multi-task branch, and nested logical flow of a workflow, for example. Previous workflow development editors also failed to provide developers with sufficient details regarding the attributes, input parameters, output parameters, and other variables associated with various tasks at certain points in the hierarchal flow of tasks in a workflow.

To address some of the current limitations of workflow editors, aspects of a workflow evaluation interface for developing, validating, and debugging workflows is described herein. In one example, a method for displaying a workflow includes capturing a workflow for management of at least one virtual machine. The workflow can include a number of schema elements, among other attributes, input parameters, and output parameters for tasks of the workflow. The method can also include evaluating a logical flow among the schema elements in the workflow and populating a flow panel in a workflow evaluation interface. The flow panel can include a hierarchical flow of tasks in the workflow and at least one nested multi-task sequence in the workflow. The flow panel can include a carrot to expand the nested multi-task sequence as a branch of the hierarchical flow of tasks. The method can also include rendering a graphical representation of the logical flow among the plurality of schema elements.

Figure 1:
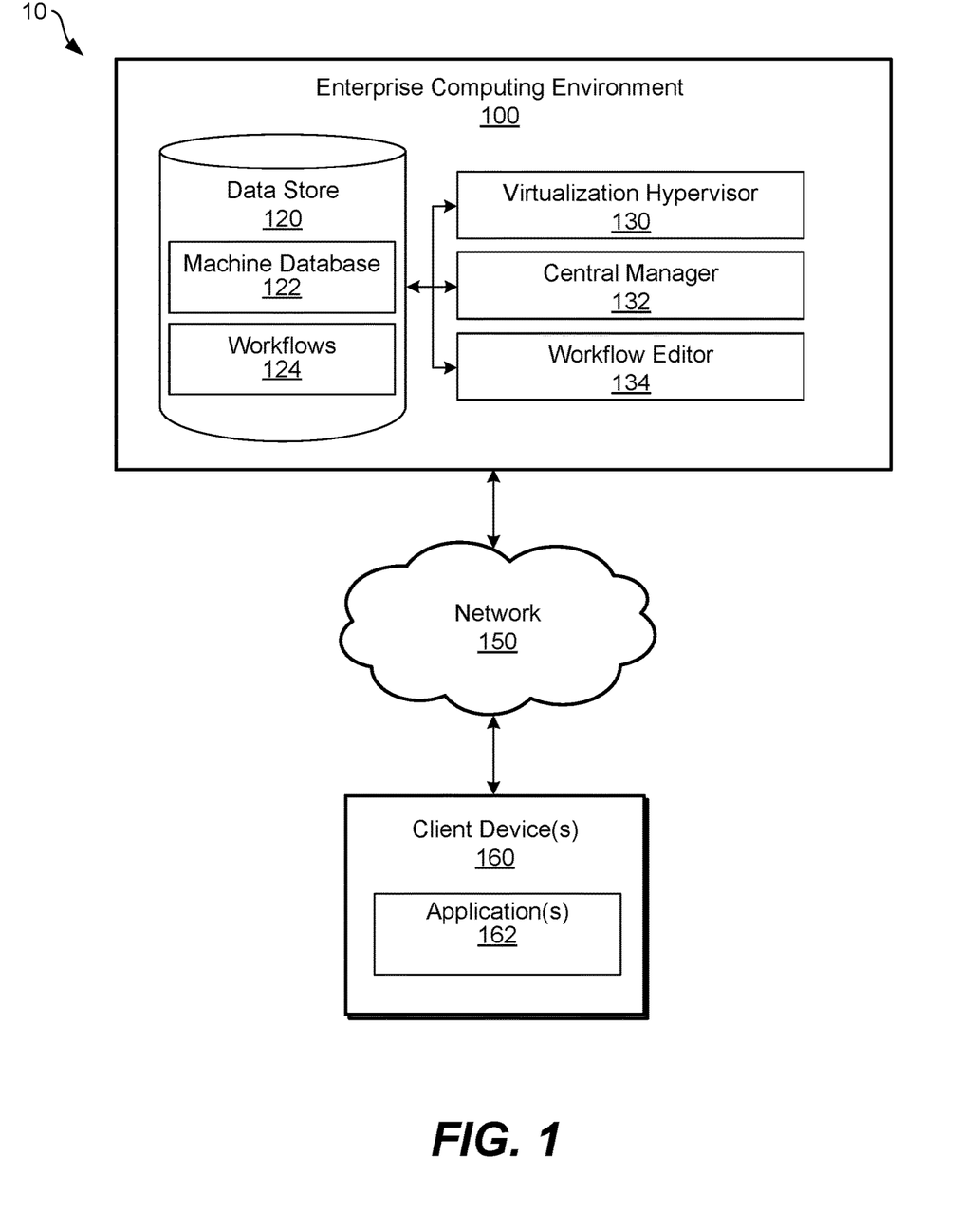
FIG. 1 illustrates an example networked environment for displaying a workflow for machine management according to various examples described herein.

Turning to the drawings, the following paragraphs describe a networked environment and discuss the operation of the same. FIG. 1 illustrates an example networked environment 10 for displaying a workflow for machine management according to various examples described herein. The networked environment 10 includes an enterprise computing environment 100, a network 150, and a number of client devices 160. Aspects of workflow management are described below with reference to the enterprise computing environment 100 and the client devices 160, but those components are representative and other networked environments and components can be relied upon to implement the concepts described herein.

The enterprise computing environment 100 can be embodied as bare metal hardware, including one or more computers, computing devices, or computing systems having a number of processors and memory devices. The enterprise computing environment 100 can include one or more computing devices arranged, for example, in one or more server or computer banks. The computing devices can be located at a single installation site or distributed among different geographical locations. The computing devices and can include a hybrid combination of local and cloud-based computing devices in some cases. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also execute computer-readable instructions (e.g., software). Thus, the enterprise computing environment 100 can also be embodied, in part, as certain functional or logical elements.

The enterprise computing environment 100 includes a data store 120, a virtualization hypervisor 130, a central manager 132, and a workflow editor 134. The data store 120 includes areas in memory for storage of a machine database 122 and workflows 124, among other types of data. The components and operation of the enterprise computing environment 100 are described in further detail below.

The enterprise computing environment 100 can operate as a virtual resource management platform, and the virtualization hypervisor 130, the central manager 132, and the workflow editor 134 can facilitate the management of the virtual resources. In one example, the virtualization hypervisor 130 can be embodied as a bare metal hypervisor (e.g., a type-1 hypervisor), executing directly on the underlying hardware of the enterprise computing environment 100. In this case, the virtualization hypervisor 130 can directly access and control the underlying hardware resources of the enterprise computing environment 100. In other embodiments, the virtualization hypervisor 130 can execute at the direction of an operating system (e.g., a type-2 hypervisor).

The virtualization hypervisor 130 can partition the underlying hardware resources of the enterprise computing environment 100 and instantiate a number of virtual machines for execution on the hardware, as partitioned. The definitions of the virtual machines can be stored in the machine database 122 in the data store 120, for reference by the virtualization hypervisor 130, the central manager 132, and the workflow editor 134. In some cases, the virtualization hypervisor can configure the enterprise computing environment 100 as a software defined data center (SDDC), facilitating the execution, management, and data interconnection of operating systems and applications executing on multiple virtual machines, forming a cloud or hybrid cloud platform.

The central manager 132 can operate as a manager of the virtualization hypervisor 130. In that context, the central manager 132 can be relied upon to simplify and organize the tasks of the virtualization hypervisor 130. As examples, the central manager 132 can be relied upon to balance workloads and prioritize resources among virtual machines, extend on-premises (i.e., local) computing environments to cloud-based computing environments, simplify data infrastructure management, minimize downtime, and provision virtual networking across multiple hosts and clusters using a centralized interface.

The workflow editor 134 can be embodied as an integrated development environment (IDE) for the creation of workflows for the enterprise computing environment 100. In that context, the workflow editor 134 provides a number of automation and debug tools. The workflow editor 134 can be relied upon to capture, develop, and edit workflows created by users or developers as described herein. To that end, the workflow editor 134 can provide one or more user interfaces, such as workflow creation and evaluation interfaces, to assist users with the development and evaluation of workflows. Once developed, the workflow editor 134 can store the workflows in the workflows 124 of the data store 120. The workflow editor 134 can also enforce permissions related to accessing and editing one or more workflows stored in the workflows 124.

Workflows can be created using the workflow editor 134 to automate complicated processes undertaken by one or both of the virtualization hypervisor 130 and the central manager 132. An example workflow may define a number of steps or tasks to be taken, such as a number of application installations, application updates, operating system updates, backups, migrations, and other IT-related process tasks to be performed by the virtualization hypervisor 130, the central manager 132, or both. As other examples, a workflow can be defined to perform tasks related to balancing workloads, prioritizing resources, extending local computing environments to cloud-based computing environments, simplifying data infrastructure management, and managing virtual network resources, among other tasks.

A workflow can be developed by users in various ways using the workflow editor 134. For example, a workflow can be developed graphically using a schema editor of the workflow editor 134, through scripts created using a scripting engine of the workflow editor 134, and using other IDE tools of the workflow editor 134. The workflows can interface with the virtualization hypervisor 130 and the central manager 132 through application programming interfaces (APIs), for example, among other interfaces.

A workflow can be defined as a hierarchical flow of tasks to be performed by the virtualization hypervisor 130, the central manager 132, or both. A workflow can be defined in part by a logical flow among a number of schema elements in the workflow, a number of attributes of the schema elements, input parameters, output parameters, and other details of the workflow. Schema elements embody the main components of a workflow, as schema elements define logical connections, branches, and the nested logical flow among the tasks in a workflow. The workflow attributes and parameters can be embodied as variables to determine the logical decisions, flows, branches, and overall paths among the tasks to be taken in a workflow.

The process for developing a workflow can involve a series of phases, including development and debug phases, among others. The workflow editor 134 facilitates each of these phases. The workflow editor 134 can also facilitate the validation and evaluation of workflows. For example, the workflow editor 134 can run workflow tests or simulations, to identify and display the hierarchical and logical flow of the tasks in workflows. Such tests can help developers to identify and remove bugs and other errors from workflows before the workflows are deployed.

The workflow editor 134 can provide one or more user interfaces, described herein as workflow evaluation interfaces, for workflow development and evaluation. The workflow evaluation interfaces can be rendered on the client devices 160 as described in further detail below. An example workflow evaluation interface can include a flow panel, a schema panel, and a details panel, among other user interface elements, to demonstrate a test or simulation of a workflow. The interfaces can permit developers to name workflows, provide tags or other descriptors that identify what workflows do, set user permissions for workflows, define the hierarchical and logical flow of tasks in workflows using schema elements, and defined the global attributes, variables, and input and output parameters for workflows, as examples. The behavior of individual schema elements and the layout and input constraints of dialog boxes can also be defined using the interfaces provided by the workflow editor 134.

The workflow editor 134 can also display various details related to workflow runs, including specific values of parameters or variables, start times, end times, intermediate task timings, delays, processing requirements, logs, and other details at respective task states in the logical flow of a workflow. A log can list the details associated with each individual event that occurs when a workflow runs. This information can include a description of the event, the user that triggered the event, the type and origin of the event, and the time and date when the event occurred, among other information. Examples of the workflow evaluation interfaces provided by the workflow editor 134 are described in greater detail below with reference to FIGS. 2 and 3.

The network 150 can include the Internet, intranets, extranets, wide area networks (WANs), local area networks (LANs), wired networks, wireless networks, cable networks, satellite networks, other suitable networks, or any combinations thereof. As one example, the enterprise computing environment 100 and the client devices 160 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the enterprise computing environment 100 and the client devices 160 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 160 are representative of one or more client devices. The client devices 160 can be embodied as any computing devices, processing circuits, or processor based devices or systems, including those in the form of desktop computers, laptop computers, tablet computers, personal digital assistants, cellular telephones, or wearable computing devices, among other example computing devices and systems. The client devices 160 can include various peripheral devices or components. The peripheral devices can include input or communications devices or modules, such as keyboards, keypads, touch pads, touch screens, microphones, cameras, wireless communications modules (e.g., infra-red, WI-FI®, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 160.

As illustrated in FIG. 1, the client devices 160 include one or more applications 162 executing on the client devices 160. As examples, the applications 162 can include hypertext-based network browsers, such as the Internet Explorer®, Firefox®, Chrome®, Safari®, or Silk® browsers, e-mail clients, messaging clients, document editors or viewers, file browsers, and other applications for other purposes. The applications 162 can be used to interface with one or more of the virtualization hypervisor 130, the central manager 132, and the workflow editor 134.

Figure 2:
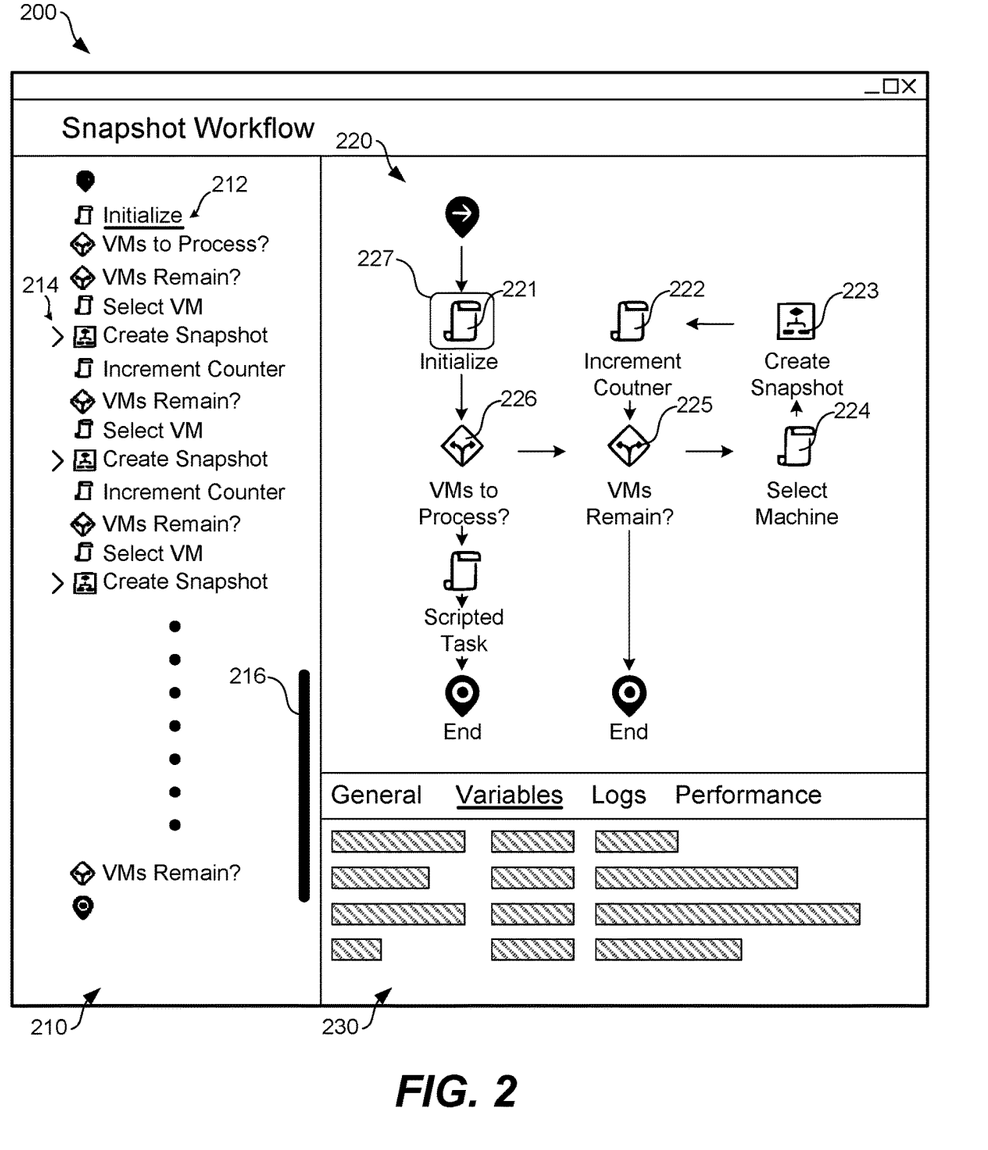
FIG. 2 illustrates an example workflow evaluation interface generated by the workflow editor shown in FIG. 1 according to various examples described herein.

FIG. 2 illustrates an example workflow evaluation interface 200 ("interface 200") that can be generated by the workflow editor 134 shown in FIG. 1 according to various examples described herein. The interface 200 is provided as a representative example in FIG. 2. The concepts described herein can be embodied in other forms, styles, and types of user interfaces. The interface 200 is particularly shown as an example interface for the development and evaluation of a workflow including a number of nested multi-item sequences.

Once generated by the workflow editor 134, the interface 200 can be rendered using an application 162 of the client device 160, such as an Internet browser application. The interface 200 can be rendered as the application 162 interfaces with the workflow editor 134 over the network 150. The interface 200 can also be provided on a display device of the client device 160. In other cases, the interface 200 can be provided on a display device of the enterprise computing environment 100 itself, and other scenarios are within the scope of the embodiments.

As shown in FIG. 2, the interface 200 provides a way to evaluate a workflow for the management of virtual machines executing on the enterprise computing environment 100. Although not shown in FIG. 2, the interface 200 can also be used to develop, define, and store the details of workflows. The workflow in the example shown in FIG. 2 is titled "Snapshot Workflow," although the interface 200 can be relied upon to illustrate aspects of any workflow. The purpose of the workflow in the example is to direct the central manager 132 to capture a snapshot of each virtual machine among a group of virtual machines hosted by the enterprise computing environment 100.

Among interface panels, dialog boxes, and other interface elements that can be relied upon, the interface 200 includes a flow panel 210, a schema panel 220, and a detail panel 230. The flow panel 210 includes a hierarchical flow of tasks defined in the workflow, provided in a list view. The first task 212 in the workflow includes the initialization of certain attributes, variables, input parameters, and output parameters for the workflow. The first task 212 is also selected, such as by using a mouse, keyboard, or other input device of the client device 160. The selection of the first task 212 is designated in the flow panel 210 using underlining in FIG. 2. The selection of the first task 212 is also designated in the schema panel 220, as described in further detail below.

As shown, the hierarchical flow in the flow panel 210 includes a number of nested multi-task sequences in the workflow. As described in further detail below with reference to FIG. 3, one of the nested multi-task sequences is designated using a carrot 214, and the carrot 214 can be expanded to show each task in the associated nested multi-task sequence. The flow panel 210 also includes a scrollbar 216. The scrollbar 216 can be relied upon to scroll among the task list in the flow panel 210, particularly in cases where a given workflow includes a significant number of tasks.

The schema panel 220 includes a graphical representation of the logical flow among schema elements in the workflow. Schema elements 221-226, among others, are referenced in FIG. 2. The schema elements 221, 222, and 224 designate script elements, the schema element 223 designates a multi-task sequence element, and the schema elements 225 and 226 designate decision elements. The schema elements shown in FIG. 2 are provided as representative examples. Other types of schema elements can be relied upon and used in workflows. The logical flow among the schema elements is illustrated using arrows in FIG. 2, although other flow designators can be relied upon.

As shown by the schema panel 220, the logical flow of a workflow can be defined in various ways, such as based on a branch determined at a decision schema element. For example, the logical flow can branch toward one of two logical paths at the decision element 226. A given workflow can include a complicated logical flow based on the evaluation of attributes, variables, and parameters while a workflow is processing. A workflow can also include any number of iterative loops, branches, and nested multi-task logical flows. The nested multi-task sequences can execute on separate logical paths, concurrently in some cases, along with other iterative loops.

As for the example shown in FIG. 2, an iterative loop exists among schema elements 222-225, with schema element 223 being representative of a nested sequence of multiple tasks in the loop. At schema element 225, a decision is made regarding whether or not additional virtual machines remain in a group of virtual machines for snapshot capture. If so, the workflow proceeds to schema element 224, where a script is executed to select the next virtual machine in the group. The logical flow then proceeds to schema element 223, where a nested sequence of tasks is performed to capture or create a snapshot for the selected machine. The logical flow then proceeds to schema element 222, where a script is executed to increment a counter associated with the group of virtual machines, before turning again to schema element 225. The iterative loop among schema elements 222-225 may continue for any number of loops depending upon the number of virtual machines in the group.

Based on the relatively simple example shown in FIG. 2, it is clear how the logical flow of a large workflow may become quite complicated and difficult to evaluate and debug in many cases. Previous workflow development editors failed to provide developers with a comprehensive view of the logical flow among each iterative loop, multi-task branch, and nested logical flow of a workflow. Previous workflow development editors also failed to provide developers with sufficient details regarding the attributes, input parameters, output parameters, and other variables associated with various tasks at certain points in the hierarchal flow of tasks in a workflow.

To address the limitations of other workflow editors and IDEs, the flow panel 210, schema panel 220, and detail panel 230 of the interface 200 provide a more comprehensive view of the hierarchical flow of tasks in workflows, including the details of how the logical flow of nested multi-task sequences proceed in iterative loops. For example, each task in the iterative loop of tasks among schema elements 222-225, including each iteration of the nested multi-task sequence at schema element 223, is shown in the hierarchical flow of tasks in the flow panel 210. The nested tasks at schema element 223 can be expanded using the carrot 214, for example, as described in further detail below with reference to FIG. 3.

Additionally, the interface 200 is designed such that the selection of one of the tasks in the flow panel 210, such as the first task 212, can be accompanied by the identification of the corresponding task in the graphical representation provided in the schema panel 220. For example, the schema element 221 in the schema panel 220 corresponds to the first task 212 in the flow panel 210. Thus, because the first task 212 is selected in the flow panel 210, the bounding indicator 227 surrounds the corresponding schema element 221 in the schema panel 220. Users can similarly select any schema element in the schema panel 220 to identify the corresponding task in the flow panel 210. Thus, a user can identify which task in the hierarchal flow shown in the flow panel 210 corresponds to which schema element in the logical flow shown in the schema panel 220.

The detail panel 230 can display various types of information relevant to one or more tasks during a workflow. The information can be specific and limited to a certain point in the workflow, such as when a certain task is being processed. Alternatively, the information can be more expansive to cover the details relevant to a group of tasks (e.g., a nested multi-task sequence). Thus, the detail panel 230 also provides a more comprehensive view of the state and status information for a workflow during the hierarchical flow of the tasks in the workflow, including the state details during nested multi-task sequences in iterative loops.

The detail panel 230 can be organized in various ways, and the "General," "Variables," "Logs," and "Performance" categories are shown as examples in FIG. 2, each of which can be individually selected by a user. The detail panel 230 can include the current state or status of the attributes, variables, input parameters, and output parameters, among other state information, for a particular task in a workflow. For example, in FIG. 2, the detail panel 230 can present the state of the attributes and variables at the first task 212, which is selected in the flow panel 210 shown in FIG. 2.

The detail panel 230 can also present other relevant information, such as task start times, task end times, intermediate task timings, user-related and processing delays, processing requirements, logs, and other details for individual tasks or groups of tasks in a workflow. The log category of the detail panel 230 can list the details associated with each individual event that occurs when a workflow runs. This information can include a description of the event, the user that triggered the event, the type and origin of the event, and the time and date when the event occurred, among other information. The performance category of the detail panel 230 can list execution times, hardware resource usage, and other performance information for individual tasks or groups of tasks.

Figure 3:
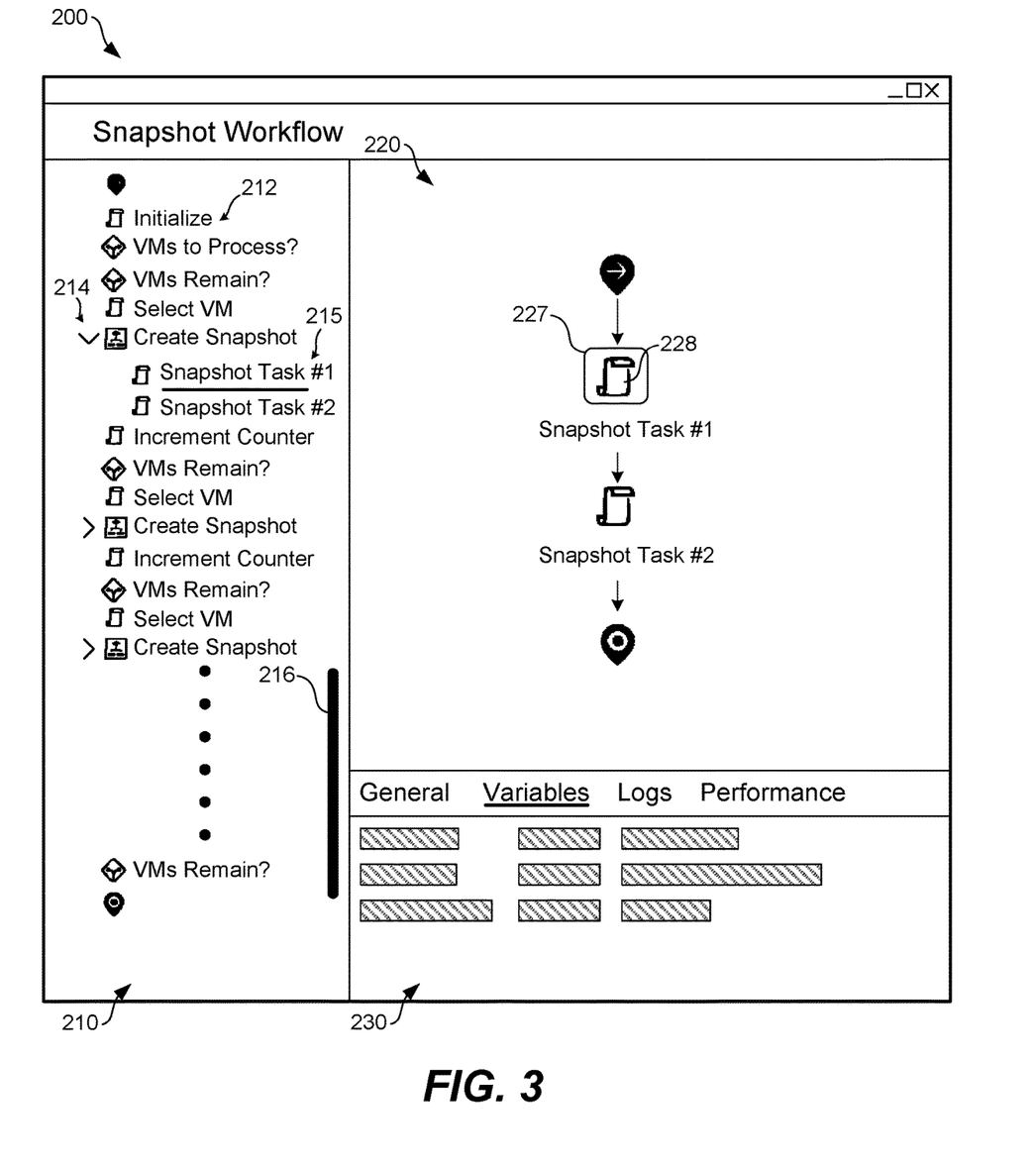
FIG. 3 illustrates another example of the workflow evaluation interface shown in FIG. 2 according to various examples described herein.

FIG. 3 illustrates another example of the workflow evaluation interface 200 shown in FIG. 2. In FIG. 3, the carrot 214 has been expanded using an input device of the client device 160, to show each task in the nested multi-task sequence at schema element 223 in FIG. 2. In the flow panel 210, two tasks, called "Snapshot Task #1" and "Snapshot Task #2," are shown in the expanded view. Task 215 has also been selected by a user using the input device of the client device 160. Because task 215 is selected in the flow panel 210, the bounding indicator 227 surrounds the schema element 228 in the schema panel 220. The schema element 228 is one element in the nested multi-task sequence of schema element 223 in FIG. 2. Thus, the schema panel 220 is updated in FIG. 3 as compared to FIG. 2, to show the logical flow within the schema element 223 in FIG. 2. The detail panel 230 also displays various types of information relevant to the task 215. In this case, the detail panel 230 can provide a comprehensive view of the state and status information for task 215, even considering that task 215 is part of a nested, multi-task sequence in an iterative loop of the workflow.

Figure 4:
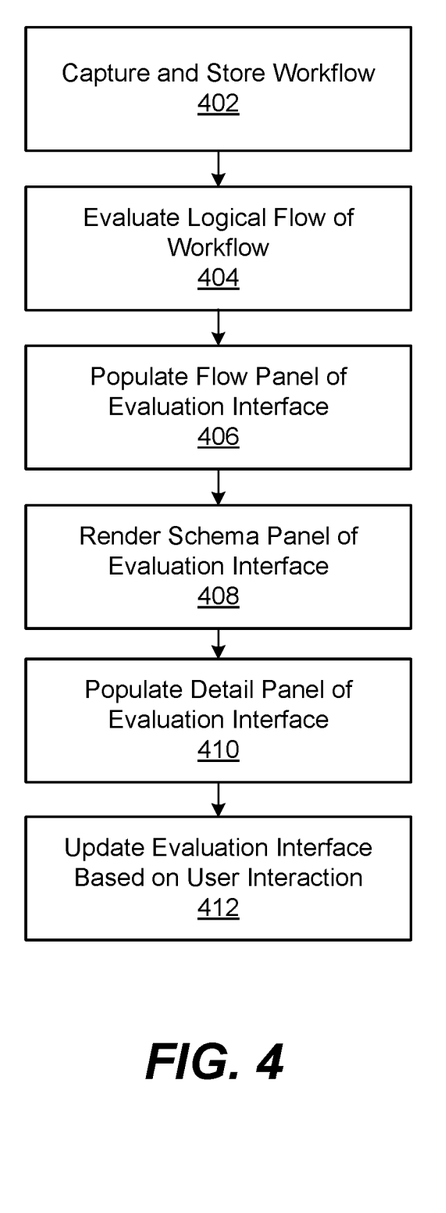
FIG. 4 illustrates an example process for displaying a workflow for machine management performed by the networked environment shown in FIG. 1 according to various examples described herein.

FIG. 4 illustrates an example process for displaying a workflow for machine management performed by the networked environment 10 shown in FIG. 1 according to various examples described herein. The processes is described in connection with the components of the networked environment 10 shown in FIG. 1, although other components in other environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 402, the process can include the workflow editor 134 capturing a workflow, as it is developed by a user of the client device 160. As described herein, the user can use the client device 160 to interface with the workflow editor 134 on the enterprise computing environment 100, to generate a workflow. The workflow can be relatively simple or complex, possibly including a number of iterative loops, branches, and nested multi-task logical flows. The workflow can be designed to direct the operations of the virtualization hypervisor 130, the central manager 132, or both, to manage one or more virtual machines executing on the enterprise computing environment 100. The workflow can be defined by a hierarchal flow of tasks and logical workflow among a number of schema elements as described above. Once generated and defined by the user, the workflow editor 134 can store the workflow in the workflows 124 of the data store 120.

At step 404, the process can include the workflow editor 134 evaluating the logical flow among the schema elements in the workflow developed at step 402. Here, the workflow editor 134 can simulate a run of the workflow developed at step 402, to model the hierarchical and logical flow of the tasks in the workflow. The evaluation can be used to present a user interface and later steps, to help the user identify and remove bugs and other errors from the workflow before the workflow is deployed.

At step 406, the process can include the workflow editor 134 populating a flow panel in a workflow evaluation interface. Referring to FIGS. 2 and 3 for an example, the workflow editor 134 can generate a network page in which the flow panel 210 in the interface 200 is populated to include the hierarchal flow of tasks of the workflow captured at step 402. In some cases, the hierarchal flow of tasks can include one or more iterative loops and nested multi-task sequences in the workflow. The nested multi-task sequences can be expanded using the carrot 214, for example, to show each task in the associated nested multi-task sequence. The flow panel 210 can also include a scrollbar 216 to scroll among a long task list in the flow panel 210.

At step 408, the process can include the workflow editor 134 rendering a schema panel in the workflow evaluation interface. Referring to FIGS. 2 and 3 for an example, the workflow editor 134 can generate a network page in which the schema panel 220 in the interface 200 is populated to include the graphical representation of the logical flow among schema elements. Schema elements 221-226, among others, are referenced in FIG. 2. The schema elements 221, 222, and 224 designate script elements, the schema element 223 designates a multi-task sequence element, and the schema elements 225 and 226 designate decision elements. Other types of schema elements can be rendered at step 408 depending upon the design and purpose of the workflow.

At step 410, the process can include the workflow editor 134 populating a detail panel in the workflow evaluation interface. Referring to FIGS. 2 and 3 for an example, the workflow editor 134 can populate the detail panel 230 in the interface 200. The detail panel 230 can display various types of information relevant to one or more tasks during the workflow. The information can be specific and limited to a certain point in the workflow, such as when a certain task is being processed. Alternatively, the information can be more expansive to cover the details relevant to a group of tasks (e.g., a nested multi-task sequence). Thus, the detail panel 230 also provides a more comprehensive view of the state and status information for a workflow during the hierarchical flow of the tasks in the workflow, including the state details during nested multi-task sequences in iterative loops.

The detail panel 230 can be organized in various ways, and the "General," "Variables," "Logs," and "Performance" categories are shown as examples in FIGS. 2 and 3. The detail panel 230 can include the current state or status of the attributes, variables, input parameters, and output parameters, among other state information, for a particular task in a workflow. For example, in FIG. 2, the detail panel 230 can present the state of the attributes and variables at the first task 212, which is selected in the flow panel 210.

The detail panel 230 can also present other relevant information, such as task start times, task end times, intermediate task timings, user-related and processing delays, processing requirements, logs, and other details for individual tasks or groups of tasks in a workflow. The log category of the detail panel 230 can list the details associated with each individual event that occurs when a workflow runs. This information can include a description of the event, the user that triggered the event, the type and origin of the event, and the time and date when the event occurred, among other information. The performance category of the detail panel 230 can list execution times, hardware resource usage, and other performance information for individual tasks or groups of tasks.

At step 412, the process can include the workflow editor 134 updating the evaluation interface based on user interaction with the interface. Among other examples described herein, users are able to select individual tasks in the flow panel 210 and individual schema elements in the schema panel 220. Upon the selection of a particular task or schema element, the workflow editor 134 can update the interface 200, for example, to highlight the selected task or schema element, to update or refresh the detail panel 230 with different information based on the selection, or to make other updates to the interface 200. In some cases, the workflow editor will update the interface 200 only to the extent necessary depending upon user interaction with the interface 200. When working with particularly large workflows, for example, the workflow editor 134 may only display a portion of the hierarchical flow of tasks or the logical flow of a schema of a workflow. If a user of the interface 200 were to move the scrollbar 216, for example, to review additional tasks in the hierarchical flow, the workflow editor 134 can update the interface 200 accordingly.

As compared to previous workflow development editors, the workflow editor 134 described herein is capable of generating workflow evaluation interfaces that provide developers with a comprehensive view of the logical flow among various logical branches, iterative loops, multi-task task sequences, and nested logical flows of a workflow. Previous workflow development editors also failed to provide developers with sufficient details regarding the attributes, input parameters, output parameters, and other variables associated with various tasks at certain points in the hierarchal flow of tasks in a workflow.

The flowchart in FIG. 4 shows examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The enterprise computing environment 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, each of the client devices 160 can include at least one processing circuit. Such a processing circuit can include, for example, one or more processors and one or more storage or memory devices coupled to a local interface.

The storage or memory devices can store data or components that are executable by the processors of the processing circuit. For example, the virtualization hypervisor 130, the central manager 132, the workflow editor 134, and/or other components can be stored in one or more storage devices and be executable by one or more processors in the enterprise computing environment 100. Similarly, the application 162 and other components can be stored in one or more storage devices and be executable by one or more processors in the client devices 160.

The virtualization hypervisor 130, central manager 132, workflow editor 134, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the virtualization hypervisor 130, central manager 132, workflow editor 134, and other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for displaying a workflow for machine management, comprising:
    capturing a workflow for management of at least one virtual machine executing in a computing environment, wherein the workflow comprises a plurality of schema elements;
    evaluating a logical flow among the plurality of schema elements in the workflow;
    populating a flow panel in a workflow evaluation interface, wherein the flow panel comprises a hierarchical flow of tasks in the workflow and at least one nested multi-task sequence in the workflow; and
    rendering a schema panel in the workflow evaluation interface, the schema panel comprising a graphical representation of the logical flow among the plurality of schema elements.

2. The method for displaying a workflow for machine management of claim 1, wherein the flow panel comprises at least one carrot to expand the nested multi-task sequence as a branch of the hierarchical flow of tasks.

3. The method for displaying a workflow for machine management of claim 1, further comprising populating a detail panel in the workflow evaluation interface for a task selected among the hierarchical flow of tasks in the flow panel.

4. The method for displaying a workflow for machine management of claim 3, wherein:
the workflow comprises a variable; and
populating the detail panel comprises displaying a value for the variable at a point in the hierarchical flow of tasks for the task selected among the hierarchical flow of tasks in the flow panel.

5. The method for displaying a workflow for machine management of claim 3, wherein the detail panel comprises at least one of a variable list, a log, or a performance detail at a point in the hierarchical flow of tasks for the task selected among the hierarchical flow of tasks in the flow panel.

6. The method for displaying a workflow for machine management of claim 1, wherein the graphical representation comprises a schema position indicator for a task selected among the hierarchical flow of tasks in the flow panel.

7. The method for displaying a workflow for machine management of claim 1, further comprising populating a detail panel in the workflow evaluation interface for a task selected in the logical flow in the schema panel.

8. The method for displaying a workflow for machine management of claim 1, wherein the workflow comprises at least one attribute, at least one input parameter, and at least one output parameter for a plurality of tasks of the workflow.

9. A non-transitory computer-readable medium embodying program code for displaying a workflow for machine management that, when executed by at least one computing device, directs the at least one computing device to at least:
capture a workflow for management of at least one virtual machine executing in a computing environment, wherein the workflow comprises a plurality of schema elements;
evaluate a logical flow among the plurality of schema elements in the workflow;
populate a flow panel in a workflow evaluation interface, wherein the flow panel comprises a hierarchical flow of tasks in the workflow and at least one nested multi-task sequence in the workflow; and
render a schema panel in the workflow evaluation interface, the schema panel comprising a graphical representation of the logical flow among the plurality of schema elements.

10. The non-transitory computer-readable medium according to claim 9, wherein the flow panel comprises at least one carrot to expand the nested multi-task sequence as a branch of the hierarchical flow of tasks.

11. The non-transitory computer-readable medium according to claim 9, wherein the at least one computing device is further directed to populate a detail panel in the workflow evaluation interface for a task selected among the hierarchical flow of tasks in the flow panel.

12. The non-transitory computer-readable medium according to claim 11, wherein:
the workflow comprises a variable; and
the at least one computing device is further directed to display, in the detail panel, a value for the variable at a point in the hierarchical flow of tasks for the task selected among the hierarchical flow of tasks in the flow panel.

13. The non-transitory computer-readable medium according to claim 11, wherein the detail panel comprises at least one of a variable list, a log, or a performance detail at a point in the hierarchical flow of tasks for the task selected among the hierarchical flow of tasks in the flow panel.

14. The non-transitory computer-readable medium according to claim 9, wherein the flow panel comprises at least one carrot to expand the nested multi-task sequence as a branch of the hierarchical flow of tasks.

15. The non-transitory computer-readable medium according to claim 9, wherein the graphical representation comprises a schema position indicator for a task selected among the hierarchical flow of tasks in the flow panel.

16. At least one computing device for displaying a workflow for machine management, comprising:
a memory device configured to store computer-readable instructions thereon; and
at least one computing device configured, through execution of the computer-readable instructions, to direct the at least one computing device to at least:
capture a workflow for management of at least one virtual machine executing in a computing environment, wherein the workflow comprises a plurality of schema elements;
evaluate a logical flow among the plurality of schema elements in the workflow;
populate a flow panel in a workflow evaluation interface, wherein the flow panel comprises a hierarchical flow of tasks in the workflow and at least one nested multi-task sequence in the workflow; and
render a schema panel in the workflow evaluation interface, the schema panel comprising a graphical representation of the logical flow among the plurality of schema elements.

17. The computing device according to claim 16, wherein the flow panel comprises at least one carrot to expand the nested multi-task sequence as a branch of the hierarchical flow of tasks.

18. The computing device according to claim 16, wherein the at least one computing device is further directed to populate a detail panel in the workflow evaluation interface for a task selected among the hierarchical flow of tasks in the flow panel.

19. The computing device according to claim 18, wherein:
the workflow comprises a variable; and
the at least one computing device is further directed to display, in the detail panel, a value for the variable at a point in the hierarchical flow of tasks for the task selected among the hierarchical flow of tasks in the flow panel.

20. The computing device according to claim 18, wherein the detail panel comprises at least one of a variable list, a log, or a performance detail at a point in the hierarchical flow of tasks for the task selected among the hierarchical flow of tasks in the flow panel.

* * * * *